US012567366B2

(12) United States Patent
Lee et al.

(10) Patent No.: US 12,567,366 B2
(45) Date of Patent: Mar. 3, 2026

(54) DISPLAY DEVICE AND ELECTRONIC APPARATUS INCLUDING THE SAME

(71) Applicant: Samsung Display Co., Ltd., Yongin-Si (KR)

(72) Inventors: Jung-Hoon Lee, Yongin-si (KR); Yonghoon Won, Yongin-si (KR); Jungsun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/612,756

(22) Filed: Mar. 21, 2024

(65) Prior Publication Data

US 2025/0069547 A1 Feb. 27, 2025

(30) Foreign Application Priority Data

Aug. 22, 2023 (KR) ........................ 10-2023-0109764

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/0247* (2013.01); *G09G 2320/0257* (2013.01); *G09G 2330/023* (2013.01); *G09G 2360/144* (2013.01)

(58) Field of Classification Search
CPC ......... G09G 3/3233; G09G 2300/0819; G09G 2300/0842; G09G 2300/0861; G09G 2320/0247; G09G 2320/0257; G09G 2330/023; G09G 2360/144; G09G 2330/022; G09G 2310/0245–0251; G09G 2310/061–063
See application file for complete search history.

(56) References Cited

U.S. PATENT DOCUMENTS

| | | | |
|---|---|---|---|
| 9,799,264 B2 | 10/2017 | Eom et al. | |
| 11,195,468 B2 | 12/2021 | Park et al. | |
| 11,626,074 B2 | 4/2023 | Roh et al. | |
| 2006/0220578 A1* | 10/2006 | Park .................... | G09G 3/3225 315/169.3 |

(Continued)

FOREIGN PATENT DOCUMENTS

| | | |
|---|---|---|
| KR | 10-1890135 B1 | 8/2018 |
| KR | 10-2020-0040344 | 4/2020 |
| KR | 10-2021-0050626 | 5/2021 |

*Primary Examiner* — Roberto W Flores
(74) *Attorney, Agent, or Firm* — Innovation Counsel LLP

(57) ABSTRACT

A display device, which is operable in a normal mode or a low afterimage mode, includes a display panel including a pixel, a gate driver providing a gate signal to the pixel, an emission driver providing to the pixel an emission signal defining a non-emission period and an emission period, a data driver providing a data voltage to the pixel, and a controller controlling the gate driver, the emission driver, and the data driver. A number of pulses of the gate signal within the non-emission period in the low afterimage mode is greater than a number of the pulses of the gate signal within the non-emission period in the normal mode. A ratio of the non-emission period to a frame period in the low afterimage mode is less than a ratio of the non-emission period to the frame period in the normal mode.

20 Claims, 7 Drawing Sheets

(56) References Cited

U.S. PATENT DOCUMENTS

| | | | | |
|---|---|---|---|---|
| 2013/0342672 | A1* | 12/2013 | Gray | H04W 12/06<br>348/78 |
| 2021/0125559 | A1* | 4/2021 | Park | G09G 3/3233 |
| 2022/0036814 | A1* | 2/2022 | Hwang | G09G 3/3233 |
| 2022/0171494 | A1* | 6/2022 | Shih | G06F 3/04883 |
| 2022/0270552 | A1* | 8/2022 | Roh | G09G 3/3266 |
| 2024/0346992 | A1* | 10/2024 | Zhang | G09G 3/32 |
| 2024/0355275 | A1* | 10/2024 | Zhang | G09G 3/3233 |

* cited by examiner

DISPLAY DEVICE AND ELECTRONIC APPARATUS INCLUDING THE SAME

CROSS-REFERENCE TO RELATED APPLICATION(S)

This application claims priority under 35 USC § 119 to Korean Patent Application No. 10-2023-0109764 filed on Aug. 22, 2023, in the Korean Intellectual Property Office (KIPO), the entire disclosure of which is incorporated by reference herein.

BACKGROUND

Field

Embodiments relate to a display device. More particularly, embodiments relate to a display device in which occurrence of afterimage is reduced and an electronic apparatus including the same.

Description of the Related Art

A display device may include a plurality of pixels that display an image. Each of the pixels may include a driving transistor that generates a driving current and a light emitting diode that emits light based on the driving current. The driving transistor may have hysteresis characteristics in which a threshold voltage shifts and the driving current changes depending on the change in voltage applied to a gate electrode of the driving transistor.

In a display device included in an electronic apparatus such as a smart watch, the display device may operate in AOD (Always On Display) mode to display a still image (e.g., a watch interface) while the electronic apparatus is not in use.

When the display device operates in a normal mode after displaying the still image for a long time in the AOD mode, the still image displayed in the AOD mode may be visible as an afterimage due to the hysteresis characteristics of the driving transistor.

SUMMARY

Embodiments as described herein may provide a display device in which visibility of afterimages is reduced.

Embodiments may provide an electronic apparatus including a display device in which visibility of afterimages is reduced.

A display device operable in a normal mode or a standby mode including a low afterimage mode according to an embodiment may include a display panel which includes a pixel, a gate driver which provides a gate signal to the pixel, an emission driver which provides an emission signal defining a non-emission period and an emission period to the pixel, a data driver which provides a data voltage to the pixel, and a controller which controls the gate driver, the emission driver, and the data driver. A number of pulses of the gate signal within the non-emission period in the low afterimage mode may be greater than a number of the pulses of the gate signal within the non-emission period in the normal mode. A ratio of the non-emission period to a frame period in the low afterimage mode may be less than a ratio of the non-emission period to the frame period in the normal mode.

In an embodiment, the pixel may include a first transistor which includes a gate electrode connected to a first node, a first electrode connected to a second node, and a second electrode connected to a third node, a second transistor which includes a gate electrode receiving a write gate signal, a first electrode receiving the data voltage, and a second electrode connected to the second node, a third transistor which includes a gate electrode receiving the write gate signal, a first electrode connected to the third node, and a second electrode connected to the first node, a fourth transistor which includes a gate electrode receiving an initialization gate signal, a first electrode receiving an initialization voltage, and a second electrode connected to the first node, a fifth transistor which includes a gate electrode receiving the emission signal, a first electrode receiving a first power voltage, and a second electrode connected to the second node, a sixth transistor which includes a gate electrode receiving the emission signal, a first electrode connected to the third node, and a second electrode connected to a fourth node, a storage capacitor which includes a first electrode connected to the first node and a second electrode receiving the first power voltage, and a light emitting diode which includes a first electrode connected to the fourth node and a second electrode receiving a second power voltage.

In an embodiment, the gate signal may include the initialization gate signal and the write gate signal.

In an embodiment, a hysteresis change amount of the first transistor in the low afterimage mode may be less than a hysteresis change amount of the first transistor in the normal mode.

In an embodiment, a range of the data voltage in the low afterimage mode may be less than a range of the data voltage in the normal mode.

In an embodiment, a number of pulses of the emission signal within the frame period in the low afterimage mode may be greater than a number of the pulses of the emission signal within the frame period in the normal mode.

In an embodiment, the display device may further include a power management circuit which provides a high gate voltage and a low gate voltage to the gate driver. A voltage level of the high gate voltage in the low afterimage mode may be lower than a voltage level of the high gate voltage in the normal mode.

In an embodiment, a voltage level of the low gate voltage in the low afterimage mode may be equal to a voltage level of the low gate voltage in the normal mode.

In an embodiment, the standby mode may further include an illuminance sensing mode in which an ambient illuminance is detected.

In an embodiment, a ratio of the non-emission period to the frame period in the illuminance sensing mode may be greater than the ratio of the non-emission period to the frame period in the low afterimage mode.

In an embodiment, the illuminance sensing mode may be performed when a user views an image displayed by the display panel.

In an embodiment, the standby mode may further include a low power mode. A number of the pulses of the gate signal within the non-emission period in the low power mode may be less than the number of the pulses of the gate signal within the non-emission period in the low afterimage mode.

In an embodiment, the low afterimage mode is performed after the low power mode is performed for a predetermined time.

In an embodiment, the standby mode may be a mode in which the display panel displays an AOD (Always On Display) image.

An electronic apparatus according to embodiments may include a display device operable in a normal mode or a standby mode including a low afterimage mode, a gyro sensor which detects a rotation state of the display device, and an illuminance sensor which detects an ambient illuminance around the display device. The display device may include a display panel which includes a pixel, a gate driver which provides a gate signal to the pixel, an emission driver which provides an emission signal defining a non-emission period and an emission period to the pixel, a data driver which provides a data voltage to the pixel, and a controller which controls the gate driver, the emission driver, and the data driver. A number of pulses of the gate signal within the non-emission period in the low afterimage mode may be greater than a number of the pulses of the gate signal within the non-emission period in the normal mode. A ratio of the non-emission period to a frame period in the low afterimage mode may be less than a ratio of the non-emission period to the frame period in the normal mode.

In an embodiment, a range of the data voltage in the low afterimage mode may be less than a range of the data voltage in the normal mode.

In an embodiment, the display device may further include a power management circuit which provides a high gate voltage and a low gate voltage to the gate driver. A voltage level of the high gate voltage in the low afterimage mode may be lower than a voltage level of the high gate voltage in the normal mode.

In an embodiment, the standby mode may further include an illuminance sensing mode in which the illuminance sensor detects the ambient illuminance.

In an embodiment, a ratio of the non-emission period to the frame period in the illuminance sensing mode may be greater than the ratio of the non-emission period to the frame period in the low afterimage mode.

In an embodiment, whether a user views an image displayed by the display device may be determined using the gyro sensor. The illuminance sensing mode may be performed when the user views the image.

In the display device and the electronic apparatus including the same according to the embodiments, the number of the pulses of the gate signal within the non-emission period in the low afterimage mode may be greater than the number of the pulses of the gate signal within the non-emission period in the normal mode, and the ratio of the non-emission period to the frame period in the low afterimage mode may be less than the ratio of the non-emission period to the frame period in the normal mode, so that a hysteresis change amount of the driving transistor included in the pixel in the low afterimage mode may be less than a hysteresis change amount of the driving transistor in the normal mode. Accordingly, an image displayed in the low afterimage mode being recognized as an afterimage in the normal mode may be prevented.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
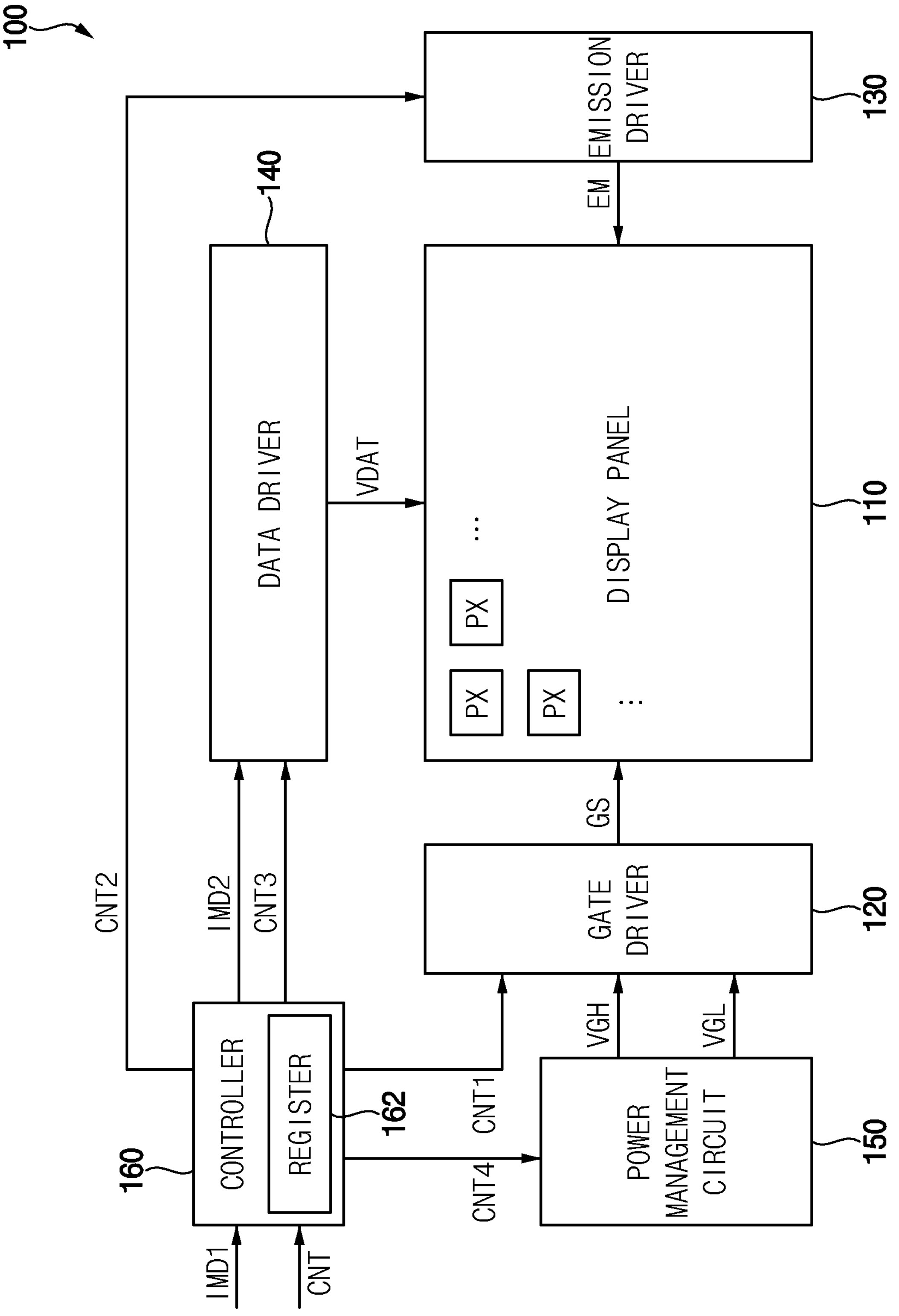
FIG. 1 is a block diagram showing a display device according to an embodiment of the present disclosure.

Hereinafter, a display device and an electronic apparatus according to embodiments of the present disclosure will be described in more detail with reference to the accompanying drawings. The same reference numerals may be used to identify similar or identical elements in the accompanying drawings.

FIG. 1 is a block diagram showing a display device 100 according to an embodiment of the present disclosure.

Referring to FIG. 1, the display device 100 may include a display panel 110, a gate driver 120, an emission driver 130, a data driver 140, a power management circuit 150, and a controller 160.

The display panel 110 may include pixels PX that are arranged in an array including rows (sometimes referred to as pixel rows) and columns (sometimes referred to as pixel columns). In an embodiment, the pixels PX may include a first pixel emitting light having a first color, a second pixel emitting light having a second color, and a third pixel emitting light having a third color. For example, the first color, the second color, and the third color may be red, green, and blue, respectively.

The gate driver 120 may provide gate signals GS to the pixels PX. The gate driver 120 may sequentially generate first to $n^{th}$ (n being a natural number of 2 or more) gate signals GS respectively corresponding to first to $n^{th}$ pixel rows. The gate driver 120 may generate the gate signals GS based on a first control signal CNT1. The first control signal CNT1 may include a gate clock signal, a gate start signal, etc.

The emission driver 130 may provide emission signals EM to the pixels PX. The emission signals EM may define for each pixel PX a non-emission period in which the pixel PX does not emit light and an emission period in which the pixel PX emits light. The emission driver 130 may sequentially generate first to $n^{th}$ emission signals EM respectively corresponding to the first to nth pixel rows based on a second control signal CNT2. The second control signal CNT2 may include an emission clock signal, an emission start signal, etc.

The data driver 140 may provide data voltages VDAT to the pixels PX. The data driver 140 may generate first to $m^{th}$ (m being a natural number of 2 or more) data voltages VDAT respectively corresponding to first to $m^{th}$ pixel columns based on second image data IMD2 and a third control signal CNT3. In an embodiment, the second image data IMD2 may include grayscale values respectively corresponding to the pixels PX. The third control signal CNT3 may include a data clock signal, a horizontal start signal, a load signal, etc.

The power management circuit 150 may provide a high gate voltage VGH and a low gate voltage VGL to the gate driver 120. The power management circuit 150 may change a voltage level of the high gate voltage VGH based on a fourth control signal CNT4.

The controller 160 may control operation (or driving) of the gate driver 120, operation (or driving) of the emission driver 130, operation (or driving) of the data driver 140, and operation (or driving) of the power management circuit 150. The controller 160 may generate the first control signal CNT1, the second control signal CNT2, the second image data IMD2, the third control signal CNT3, and the fourth control signal CNT4 based on first image data IMD1 and a control signal CNT. In an embodiment, the first image data IMD1 may include grayscale values respectively corresponding to the pixels PX. The controller 160 may convert the first image data IMD1 into the second image data IMD2. The control signal CNT may include a master clock signal, a vertical synchronization signal, a horizontal synchronization signal, a data enable signal, etc.

The display device 100 may be driven in a normal mode or a standby mode. In an embodiment, the standby mode may be a mode in which the display panel 110 displays a low luminance AOD (Always On Display) image. In an embodiment, the standby mode may include a low afterimage mode, a low power mode, an illuminance sensing mode, etc.

In an embodiment, the controller 160 may include a register 162. The user may set whether to operate the standby mode, whether to operate the low power mode, an operation time of the low power mode, whether to operate the low afterimage mode, whether to operate the illuminance sensing mode, etc., and the user's settings may be stored in the register 162. The controller 160 may control an operation of the standby mode, an operation of the low power mode, an operation of the low afterimage mode, and an operation of the illuminance sensing mode based on the user's settings stored in the register 162.

In an embodiment, the number of pulses of the gate signal GS within the non-emission period in the low afterimage mode may be greater than the number of the pulses of the gate signal GS within the non-emission period in the normal mode, and a ratio of the non-emission period to a frame period in the low afterimage mode may be less than a ratio of the non-emission period to the frame period in the normal mode. Accordingly, a change amount of hysteresis of a driving transistor included in each of the pixels PX in the low afterimage mode may decrease, and the AOD image displayed in the low afterimage mode may be less visible or not visible as an afterimage in a following image displayed in the normal mode.

Figure 2:
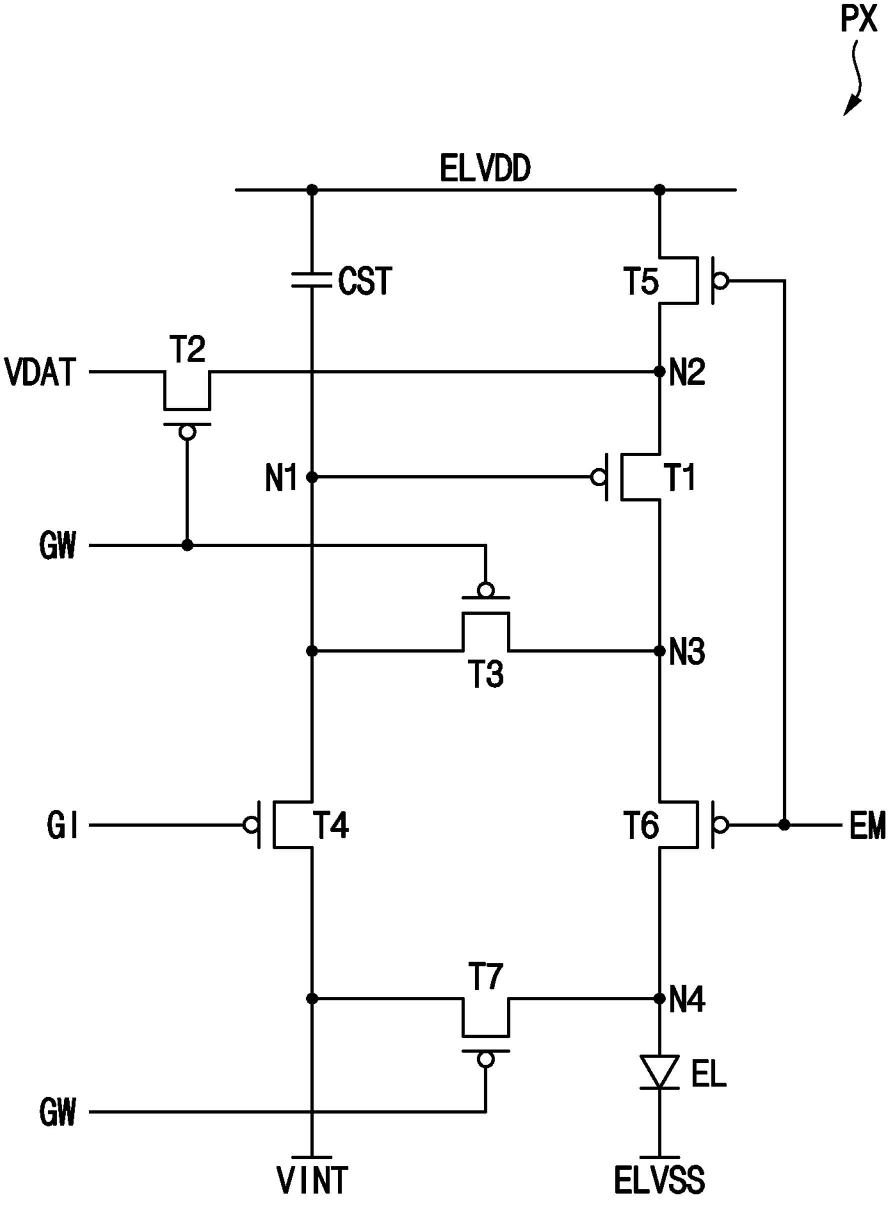
FIG. 2 is a circuit diagram showing a pixel included in the display device of FIG. 1.

FIG. 2 is a circuit diagram showing one of the pixels PX included in the display device 100 of FIG. 1.

Referring to FIGS. 1 and 2, the pixel PX may include a driving transistor (hereinafter referred to as a first transistor) T1, a write transistor (hereinafter referred to as a second transistor) T2, a compensation transistor (hereinafter referred to as a third transistor) T3, an initialization transistor (hereinafter referred to as a fourth transistor) T4, a first emission transistor (hereinafter referred to as a fifth transistor) T5, a second emission transistor (hereinafter referred to as the sixth transistor) T6, a bypass transistor (hereinafter referred to as a seventh transistor) T7, a storage capacitor CST, and a light emitting diode EL. In the example of FIG. 2, the gate signal GS may include an initialization gate signal GI and a write gate signal GW.

The first transistor T1 may include a gate electrode connected to a first node N1, a first electrode connected to the second node N2, and a second electrode connected to the third node N3. Accordingly, the first transistor T1 may be connected between the second node N2 and the third node N3 and may be turned on or off in response to a voltage of the first node N1. The first transistor T1 may generate a driving current corresponding to a voltage difference between the first node N1 and the second node N2.

The second transistor T2 may be connected between a data line transmitting the data voltage VDAT and the second node N2 and may be turned on in response to the write gate signal GW. The second transistor T2 may include a gate electrode that receives the write gate signal GW, a first electrode that receives the data voltage VDAT, and a second electrode connected to the second node N2. The second transistor T2 may transmit the data voltage VDAT to the second node N2 in response to the write gate signal GW.

The third transistor T3 may be connected between the third node N3 and the first node N1 and may be turned on in response to the write gate signal GW. The third transistor T3 may include a gate electrode that receives the write gate signal GW, a first electrode connected to the third node N3, and a second electrode connected to the first node N1. The third transistor T3 may connect the third node N3 and the first node N1 in response to the write gate signal GW.

The fourth transistor T4 may be connected between an initialization voltage line transmitting an initialization voltage VINT and the first node N1 and may be turned on in response to the initialization gate signal GI. The fourth transistor T4 may include a gate electrode that receives the initialization gate signal GI, a first electrode that receives the initialization voltage VINT, and a second electrode connected to the first node N1. The fourth transistor T4 may transmit the initialization voltage VINT to the first node N1 in response to the initialization gate signal GI.

The fifth transistor T5 may be connected between a first power voltage line transmitting a first power voltage ELVDD and the second node N2 and may be turned on in response to the emission signal EM. The fifth transistor T5 may include a gate electrode that receives the emission signal EM, a first electrode that receives the first power voltage ELVDD, and a second electrode connected to the second node N2. The fifth transistor T5 may transmit the first power voltage ELVDD to the second node N2 in response to the emission signal EM.

The sixth transistor T6 may be connected between the third node N3 and a fourth node N4 and may be turned on in response to the emission signal EM. The sixth transistor T6 may include a gate electrode that receives the emission signal EM, a first electrode connected to the third node N3, and a second electrode connected to the fourth node N4. The sixth transistor T6 may connect the third node N3 and the fourth node N4 in response to the emission signal EM.

The seventh transistor T7 may be connected between the initialization voltage line and the fourth node N4 and may be turned on in response to the write gate signal GW. The seventh transistor T7 may include a gate electrode that receives the write gate signal GW, a first electrode that receives the initialization voltage VINT, and a second electrode connected to the fourth node N4. The seventh transistor T7 may transmit the initialization voltage VINT to the fourth node N4 in response to the write gate signal GW.

FIG. 2 shows an embodiment in which each of the first transistor T1, the second transistor T2, the third transistor T3, the fourth transistor T4, the fifth transistor T5, the sixth transistor T6, and the seventh transistor T7 is a P-type transistor (e.g., PMOS transistor), but the present disclosure is not limited thereto. In another embodiment, at least one of the first transistor T1, the second transistor T2, the third transistor T3, the fourth transistor T4, the fifth transistor T5, the sixth transistor T6, and the seventh transistor T7 may be an N-type transistor (e.g., NMOS transistor).

The storage capacitor CST may be connected between the first node N1 and the first power voltage line. The storage capacitor CST may include a first electrode connected to the first node N1 and a second electrode that receives the first power voltage ELVDD. The storage capacitor CST may store or maintain the voltage of the first node N1.

FIG. 2 shows an embodiment in which the pixel PX includes seven transistors and one capacitor, but the present disclosure is not limited thereto. In another embodiment, the pixel PX may include three to six or eight or more transistors and/or two or more capacitors.

The light emitting diode EL may be connected between the fourth node N4 and a second power voltage line transmitting the second power voltage ELVSS. The light emitting diode EL may include a first electrode (e.g., anode) connected to the fourth node N4 and a second electrode (e.g., cathode) that receives the second power voltage ELVSS. The light emitting diode EL may emit light having an intensity that depends on the driving current.

In an embodiment, the light emitting diode EL may be an organic light emitting diode. In another embodiment, the light emitting diode EL may be an inorganic light emitting diode, a micro light emitting diode, or a quantum dot light emitting diode.

Figure 3:
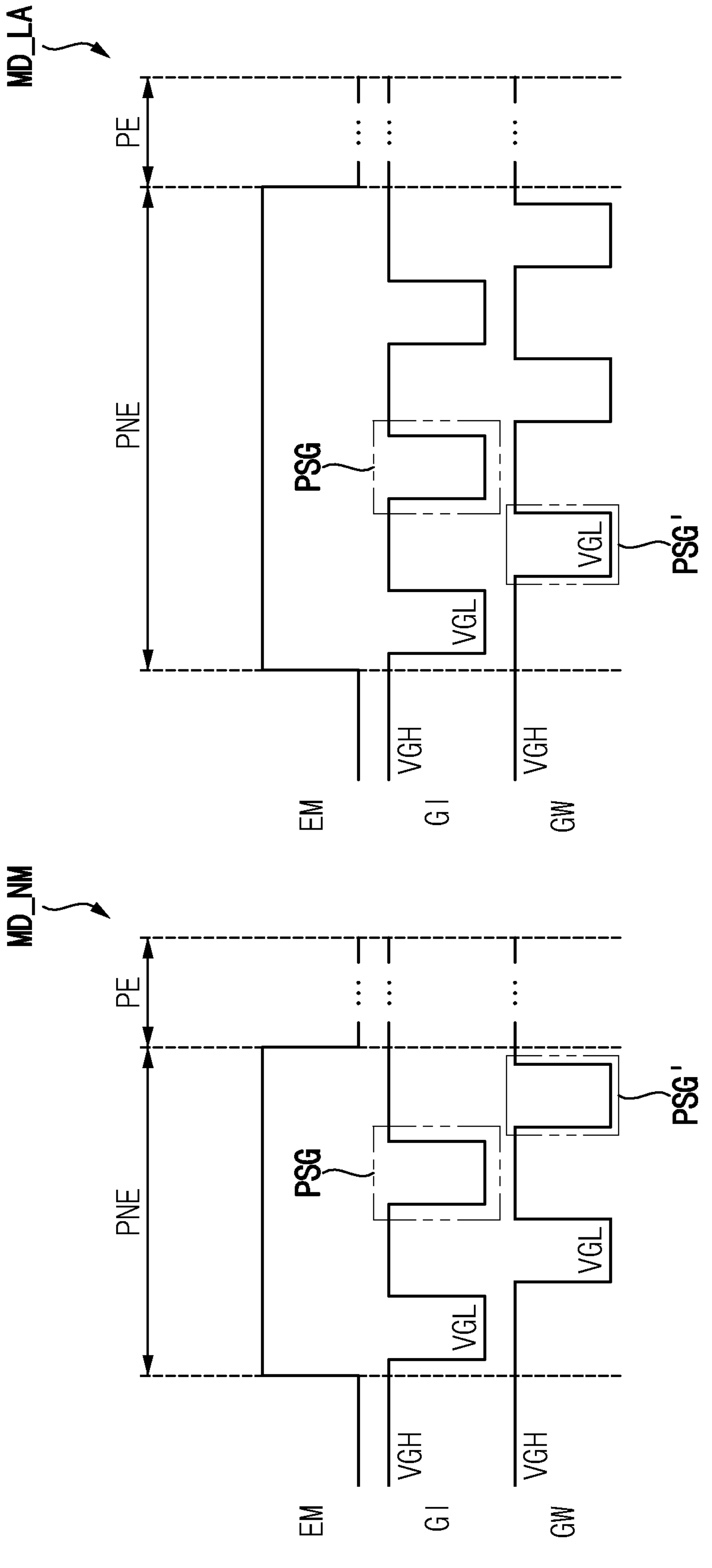
FIG. 3 is a timing diagram showing a gate signal and an emission signal during operation of the pixel of FIG. 2 in a normal mode and a low afterimage mode.

FIG. 3 illustrates the emission signal EM, the initialization gate signal GI, and the write gate signal GW during operation of the pixel PX of FIG. 2 in the normal mode MD_NM and the low afterimage mode MD_LA.

Referring to FIGS. 1 to 3, the voltage levels of the emission signal EM may define a non-emission period PNE and an emission period PE. A period in which the emission signal EM has a high voltage (e.g., turn-off voltage) may be defined as the non-emission period PNE, and a period in which the emission signal EM has a low voltage (e.g., turn-on voltage) may be defined as the emission period PE.

Pulses of the gate signal GS may be provided to the pixel PX during the non-emission period PNE. Pulses PSG of the initialization gate signal GI and pulses PSG' of the write gate signal GW may be provided to the pixel PX during the non-emission period PNE. Each pulse PSG or PSG' may include a falling edge where the high gate voltage VGH transitions to the low gate voltage VGL, an interval during which the signal voltage remains at the low gate voltage VGL, and a rising edge where the low gate voltage VGL transitions to the high gate voltage VGH.

The pulses PSG of the initialization gate signal GI and the pulses PSG' of the write gate signal GW may alternate. In an embodiment, the waveform of the write gate signal GW may be the same as the waveform of the initialization gate signal GI but shifted in time so that the pulses PSG do not overlap the pulses PSG'.

The initialization voltage VINT may be applied to the first node N1 and therefore the gate electrode of the first transistor T1 in response to the pulses PSG of the initialization gate signal GI. Accordingly, the gate electrode of the first transistor T1 may be initialized to the initialization voltage, which may on-bias the first transistor T1 during the pulses PSG of the initialization gate signal GI.

The data voltage VDAT may be applied through the second transistor T2, the first transistor T1, and the third transistor T3 to the gate electrode of the first transistor T1 in response to the pulses PSG' of the write gate signal GW, and the first transistor T1 (being initialized to on-biased) applies to the node N1 the data voltage VDAT with compensation for a threshold voltage of the first transistor T1. Accordingly, the data voltage VDAT in which the threshold voltage is compensated may be stored in the storage capacitor CST, and the first transistor T1 may be off-biased in response to the pulse PSG'. Further, the initialization voltage VINT may be applied to the first electrode of the light emitting diode EL in response to the pulses PSG' of the write gate signal GW. Accordingly, the first electrode of the light emitting diode EL may be initialized.

An on-bias state and an off-bias state of the first transistor T1 may be repeated or cycled in the non-emission period PNE, so that a hysteresis change amount of the first transistor T1 may decrease.

The number of pulses PSG of the gate signal GS within the non-emission period PNE in the low afterimage mode MD_LA may be greater than the number of pulses PSG of the gate signal GS within the non-emission period PNE in the normal mode MD_NM. In an embodiment, as shown in FIG. 3, the number of pulses of the gate signal GS within the non-emission period PNE in the low afterimage mode MD_LA may be three, and the number of pulses PSG of the gate signal GS within the non-emission period PNE in the normal mode MD_NM may be two. As the number (or times) of repeating the on-bias state and the off-bias state of the first transistor T1 increases, the hysteresis change amount of the first transistor T1 may decrease. Accordingly, the hysteresis change amount of the first transistor T1 in the low afterimage mode MD_LA may be less than the hysteresis change amount of the first transistor T1 in the normal mode MD_NM.

In the emission period PE, the first transistor T1 may generate the driving current based on the data voltage VDAT with the threshold voltage compensation, which the storage capacitor CST stores, and the light emitting diode EL may emit light having a luminance corresponding to the driving current.

Figure 4:
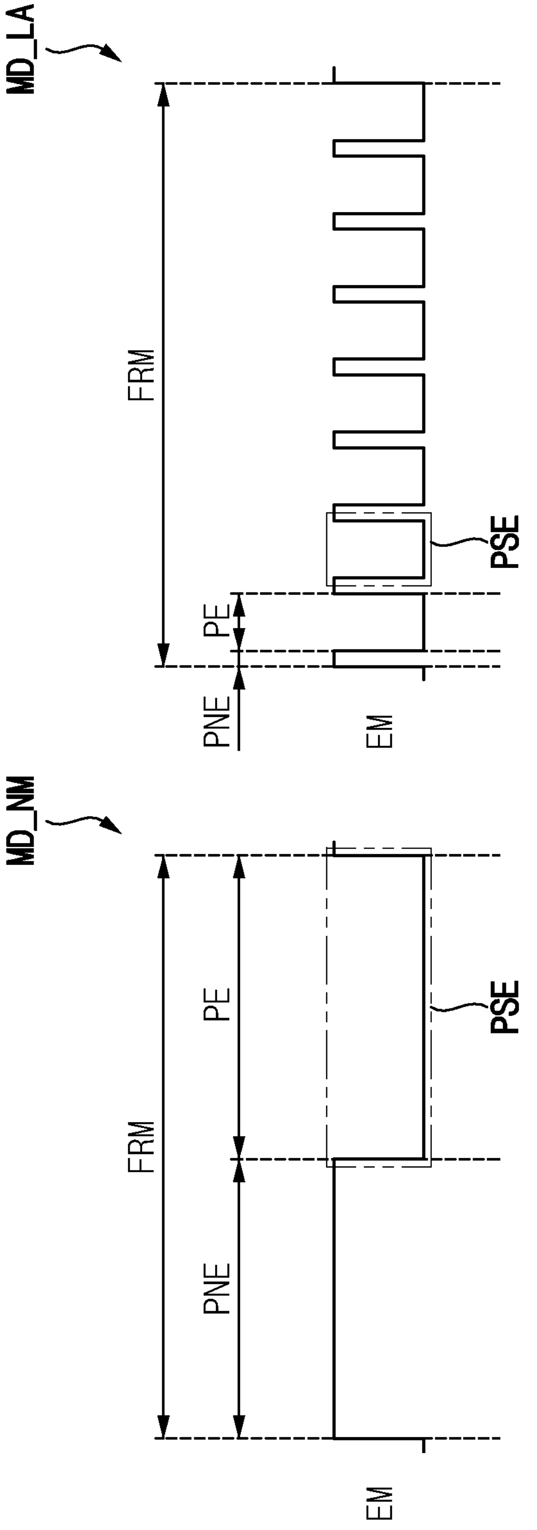
FIG. 4 is a timing diagram showing an emission signal in the normal mode and the low afterimage mode.
Figure 5:
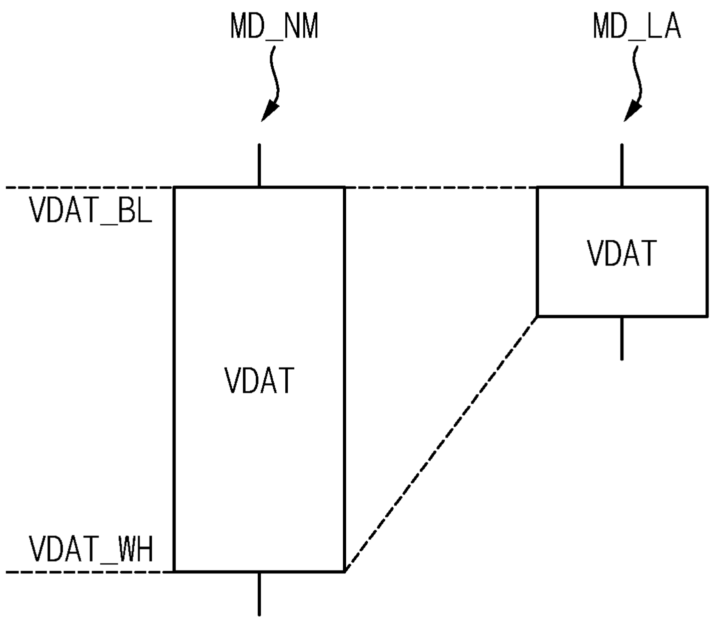
FIG. 5 shows ranges of a data voltage in the normal mode and the low afterimage mode.

FIG. 4 is a timing diagram illustrating the emission signal EM in the normal mode MD_NM and the low afterimage mode MD_LA. FIG. 5 shows respective ranges of the data voltage VDAT in the normal mode MD_NM and the low afterimage mode MD_LA.

Referring to FIGS. 4 and 5, an emission off ratio, which is a ratio of the duration of the non-emission period PNE to a frame period FRM, in the normal mode MD_NM may be greater than a minimum emission off ratio. For example, the minimum emission off ratio may be about 40%. An illuminance sensor may detect an ambient illuminance around the display device during the non-emission period PNE in the normal mode MD_NM, and the brightness of an image displayed in the normal mode may be adjusted according to the ambient illuminance measured around the display device. A minimum non-emission period PNE within the frame period FRM in the normal mode may need to be long enough for the operation of the illuminance sensor.

The number of pulses PSE of the emission signal EM within the frame period FRM in the low afterimage mode MD_LA may be greater than the number of pulses PSE of the emission signal EM within the frame period FRM in the normal mode MD_NM. In the standby mode displaying an AOD image with a low luminance, flicker may be visible when the number of pulses PSE of the emission signal EM within the frame period FRM is small, so that the number of pulses PSE of the emission signal EM within the frame period FRM may increase in the low afterimage mode MD_LA to prevent the flicker from being visible. Since the number of pulses PSE of the emission signal EM within the frame period FRM increases in the low afterimage mode MD_LA, the available time for the non-emission period PNE in the low after image mode MD_LA may be too short for operation of the illuminance sensor. In an embodiment, as shown in FIG. 4, the number of pulses PSE of the emission signal EM within the frame period FRM in the low afterimage mode MD_LA may be eight, and the number of pulses PSE of the emission signal EM within the frame period FRM in the normal mode MD_NM may be one.

A ratio of the non-emission period PNE to the frame period FRM in the low afterimage mode MD_LA may be less than the ratio of the non-emission period PNE to the frame period FRM in the normal mode MD_NM, and a range of the data voltage VDAT in the low afterimage mode MD_LA may be less than a range of the data voltage VDAT in the normal mode MD_NM. Since the illuminance sensor does not operate in the low afterimage mode MD_LA, the ratio of the non-emitting period PNE to the frame period FRM may decrease, and with the corresponding increase in the emission time per frame in the low afterimage mode MD_LA, the range of the data voltage VDAT may decrease in the low afterimage mode MD_LA. In an embodiment, the ratio of the non-emission period PNE to the frame period FRM in the low afterimage mode MD_LA may be about 14%, and the ratio of the non-emission period PNE to the frame period FRM in the normal mode MD_NM may be about 43.2%. In an embodiment, a voltage level of a black data voltage VDAT_BL in the low afterimage mode MD_LA may be substantially equal to a voltage level of the black data voltage VDAT_BL in the normal mode MD_NM, and a voltage level of a white data voltage VDAT_WH in the low afterimage mode MD_LA may be higher than a voltage level of the white data voltage VDAT_WH in the normal mode MD_NM.

As the range of the data voltage VDAT narrows, the magnitude of a voltage change of the gate electrode of the first transistor T1 may decrease, so that the hysteresis change amount of the first transistor T1 may decrease. Accordingly, the hysteresis change amount of the first transistor T1 in the low afterimage mode MD_LA may be less than the hysteresis change amount of the first transistor T1 in the normal mode MD_NM.

Figure 6:
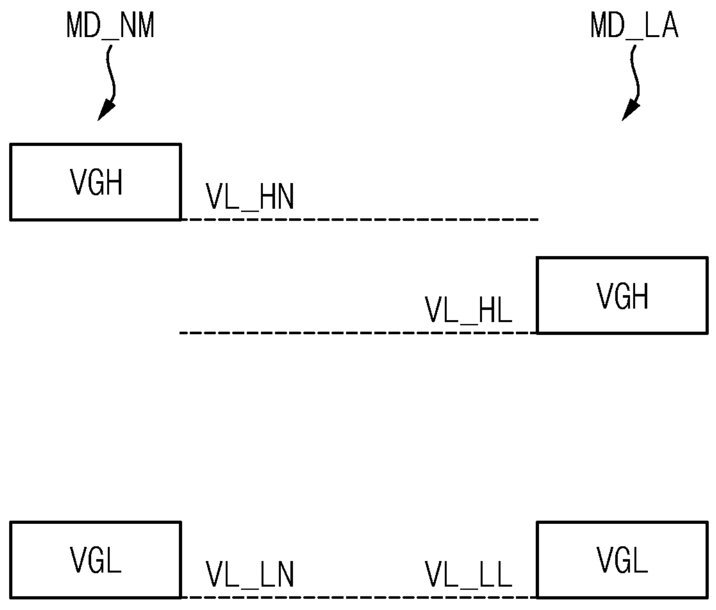
FIG. 6 shows a high gate voltage and a low gate voltage in the normal mode and the low afterimage mode.

FIG. 6 shows levels of the high gate voltage VGH and the low gate voltage VGL in the normal mode MD_NM and the low afterimage mode MD_LA.

Referring to FIG. 6, a voltage level VL_HL of the high gate voltage VGH in the low afterimage mode MD_LA may be lower than a voltage level VL_HN of the high gate voltage VGH in the normal mode MD_NM, and a voltage level VL_LL of the low gate voltage VGL in the low afterimage mode MD_LA may be substantially equal to a voltage level VL_LN of the low gate voltage VGL in the normal mode MD_NM. Accordingly, a difference between the voltage level VL_HL of the high gate voltage VGH and the voltage level VL_LL of the low gate voltage VGL in the low afterimage mode MD_LA may be less than a difference between the voltage level VL_HN of the high gate voltage VGH and the voltage level VL_LN of the low gate voltage VGL in the normal mode MD_NM.

When the gate signal GS changes from the high gate voltage VGH to the low gate voltage VGL (or from the low gate voltage VGL to the high gate voltage VGH), a kickback voltage corresponding to a change in the gate signal GS may occur at the gate electrode of the first transistor T1. As the change in the gate signal GS (in other words, a difference between the high gate voltage VGH and the low gate voltage VGL) decreases, the kickback voltage may decrease, and accordingly, since the magnitude of change in voltage at the gate electrode of the first transistor T1 decreases, the hysteresis change amount of the first transistor T1 may decrease. Accordingly, the hysteresis change amount of the first transistor T1 in the low afterimage mode MD_LA may be less than the hysteresis change amount of the first transistor T1 in the normal mode MD NM.

Figure 7:
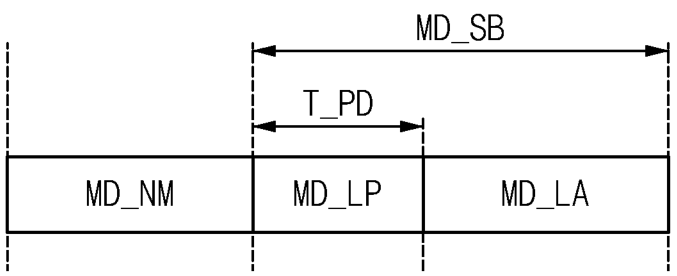
FIG. 7 illustrates an example of an operation of the display device of FIG. 1 in a normal mode and a standby mode.

FIG. 7 illustrates an example of an operation of the display device 100 of FIG. 1.

Referring to FIGS. 1 and 7, the display device 100 may be driven in the normal mode MD_NM or the standby mode MD_SB, and the standby mode MD_SB may include the low power mode MD_LP and the low afterimage mode MD_LA.

The number of the pulses of the gate signal within the non-emission period in the low power mode MD_LP may be less than the number of pulses of the gate signal within the non-emission period in the low afterimage mode MD_LA. As the number of the pulses of the gate signal decreases, power consumption of the display device 100 may be reduced. Accordingly, the power consumption of the display device 100 in the low power mode MD_LP may be less than the power consumption of the display device 100 in the low afterimage mode MD_LA.

When a driving mode of the display device 100 is switched from the normal mode MD_NM to the standby mode MD_SB, the display device 100 may be driven in the low power mode MD_LP. Accordingly, the display device 100 may be driven in the low power mode MD_LP that minimizes the power consumption during an initial period of the standby mode MD_SB.

The low afterimage mode MD_LA may be performed after the low power mode MD_LP is performed for a predetermined time T_PD. The time T_PD during which the low power mode MD_LP is performed may be set by the user.

In the prior art, when the display device is driven in the normal mode MD_NM after being driven in the standby mode MD_SB for a long time, the AOD image displayed in the standby mode MD_SB may be recognized as an afterimage in the normal mode MD NM due to the hysteresis characteristics of the driving transistor T1 included in the pixel PX. However, in the embodiments of the present disclosure, the hysteresis change amount of the driving transistor T1 included in the pixel PX may decrease in the low afterimage mode MD_LA, so that the AOD image displayed in the standby mode MD_SB may not be recognized as an afterimage in the normal mode MD_NM.

Figure 8:
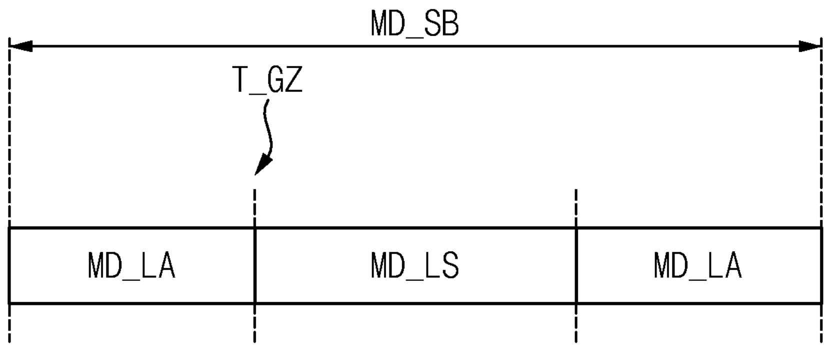
FIG. 8 illustrates an example of an operation of the display device of FIG. 1 in a standby mode.

FIG. 8 illustrates an example of an operation of the display device 100 of FIG. 1.

Referring to FIGS. 1 and 8, the standby mode MD_SB may include the low afterimage mode MD_LA and the illuminance sensing mode MD_LS. In the illuminance sensing mode MD_LS, the illuminance sensor may detect an ambient illuminance of the environment around the display device 100.

The ratio of the non-emission period to the frame period in the illuminance sensing mode MD_LS may be greater than the ratio of the non-emission period to the frame period in the low afterimage mode MD_LA. When the ratio of the non-emission period to the frame period increases (that is, when the emission period decreases and the non-emission period increases), a time for the illuminance sensor to operate may be secured. Accordingly, the illuminance sensor may detect the ambient illuminance around the display device 100 in the illuminance sensing mode MD_LS, and the display device 100 may optimize a luminance of the displayed image according to the detected ambient illuminance.

The illuminance sensing mode MD_LS may be performed when the user views the image displayed by the display panel 110. In an embodiment, as shown in FIG. 8, a gyro sensor that detects a rotation state of the display device 100 may be used to determined that the user views the image displayed by the display panel 110 at a time T_GZ, and the display device 100 may operate in the illuminance sensing mode MD_LS thereby sensing ambient illuminance and optimizing the luminance of the displayed image according to the detected ambient illuminance.

Figure 9:
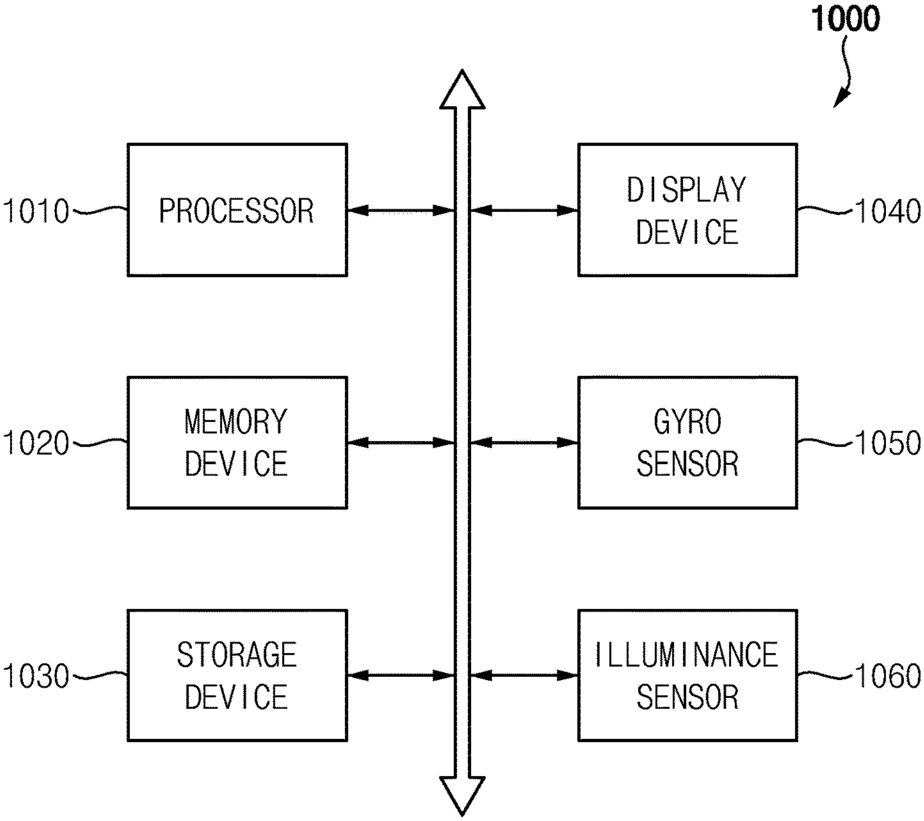
FIG. 9 is a block diagram showing an electronic apparatus according to an embodiment of the present disclosure.
Figure 10:
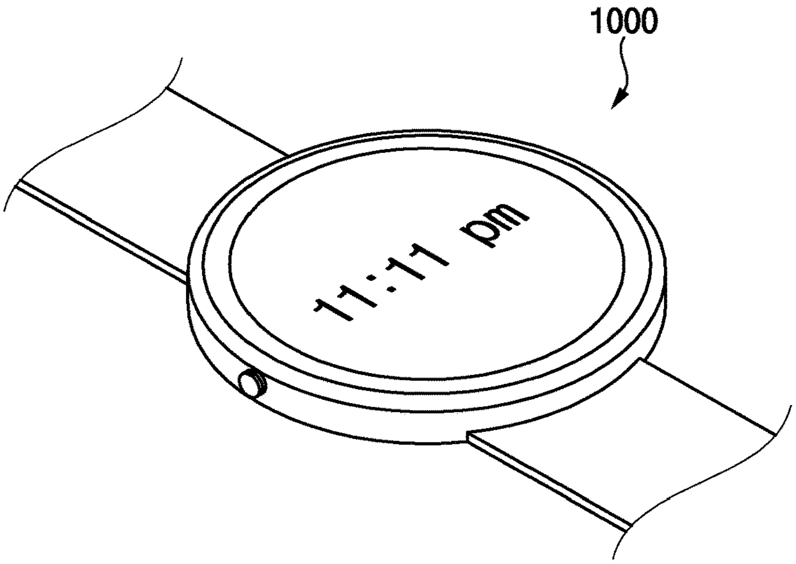
FIG. 10 is a diagram showing an example in which the electronic apparatus of FIG. 9 is a smart watch.

FIG. 9 is a block diagram showing an electronic apparatus 1000 according to an embodiment of the present disclosure. FIG. 10 is a diagram showing an example in which the electronic apparatus 1000 of FIG. 9 is implemented as a smart watch.

Referring to FIGS. 9 and 10, an electronic apparatus 1000 may include a processor 1010, a memory device 1020, a storage device 1030, a display device 1040, a gyro sensor 1050, and an illuminance sensor 1060. The electronic apparatus 1000 may further include a plurality of ports capable of communicating with a video card, a sound card, a memory card, a USB device, or the like, or communicating with other systems.

According to an embodiment, as shown in FIG. 10, the electronic apparatus 1000 may be implemented as a smart watch. However, the present disclosure is not limited thereto, and according to another embodiment, the electronic apparatus 1000 may be implemented as a television, a mobile phone, a video phone, a smart pad, a tablet PC, a vehicle navigation, a laptop computer, a head-mounted display, or the like.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, and the like. According to an embodiment, the processor 1010 may also be coupled to an expansion bus such as a peripheral component interconnect (PCI) bus. According to an embodiment, the processor 1010 may provide the first image data IMD1 of FIG. 1 and the control signal CNT of FIG. 1 to the display device 1040.

The memory device 1020 may store data required for operation of the electronic apparatus 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and the like.

The display device 1040 may be connected to other components through the buses or other communication links. The display device 1040 may correspond to the display device 100 of FIG. 1. The display device 1040 may be driven in the normal mode MD_NM of FIG. 7 or the standby mode MD_SB of FIG. 7. The standby mode MD_SB may include the low power mode MD_LP of FIG. 7, the low afterimage mode MD_LA in FIG. 7, and the illuminance sensing mode MD_LS of FIG. 8.

The gyro sensor 1050 may detect the rotation state of the display device 1040. In the standby mode MD_SB, when the gyro sensor 1050 detects motion indicating that the user is viewing the image displayed by the display device 1040, the illuminance sensing mode MD_LS may be performed.

The illuminance sensor 1060 may detect the ambient illuminance of the environment around the display device 1040. In the illuminance sensing mode MD_LS, the ambient illuminance may be detected using the illuminance sensor 1060, and the luminance of the image displayed by the display device 1040 may be optimized according to the detected ambient illuminance.

The display device according to the disclosed embodiments may be applied to a display device included in a computer, a notebook, a mobile phone, a smart phone, a smart pad, a smart watch, a PMP, a PDA, an MP3 player, or the like.

Although the display devices and the electronic apparatuses according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device operable in a normal mode or a standby mode including a low afterimage mode, the display device comprising:

a display panel which includes a pixel;

a gate driver which provides a gate signal to the pixel;

an emission driver which provides to the pixel an emission signal defining a non-emission period and an emission period;

a data driver which provides a data voltage to the pixel; and a controller which controls the gate driver, the emission driver, and the data driver, wherein a number of pulses of the gate signal within the non-emission period in the low afterimage mode is greater than a number of the pulses of the gate signal within the non-emission period in the normal mode, wherein a ratio of the non-emission period to a frame period in the low afterimage mode is less than a ratio of the non-emission period to the frame period in the normal mode, and wherein a voltage of an input white data input to the controller in the low afterimage mode is lower than a voltage of the input white data in the normal mode.

2. The display device of claim 1, wherein the pixel includes:

a first transistor which includes a gate electrode connected to a first node, a first electrode connected to a second node, and a second electrode connected to a third node;

a second transistor which includes a gate electrode receiving a write gate signal, a first electrode receiving the data voltage, and a second electrode connected to the second node;

a third transistor which includes a gate electrode receiving the write gate signal, a first electrode connected to the third node, and a second electrode connected to the first node;

a fourth transistor which includes a gate electrode receiving an initialization gate signal, a first electrode receiving an initialization voltage, and a second electrode connected to the first node a fifth transistor which includes a gate electrode receiving the emission signal, a first electrode receiving a first power voltage, and a second electrode connected to the second node;

a sixth transistor which includes a gate electrode receiving the emission signal, a first electrode connected to the third node, and a second electrode connected to a fourth node;

a storage capacitor which includes a first electrode connected to the first node and a second electrode receiving the first power voltage; and a light emitting diode which includes a first electrode connected to the fourth node and a second electrode receiving a second power voltage.

3. The display device of claim 2, wherein the gate signal includes the initialization gate signal and the write gate signal.

4. The display device of claim 2, wherein a hysteresis change amount of the first transistor in the low afterimage mode is less than a hysteresis change amount of the first transistor in the normal mode.

5. The display device of claim 1, wherein a range of the data voltage in the low afterimage mode is less than a range of the data voltage in the normal mode.

6. The display device of claim 1, wherein a number of pulses of the emission signal within the frame period in the low afterimage mode is greater than a number of the pulses of the emission signal within the frame period in the normal mode.

7. The display device of claim 1, further comprising:

a power management circuit which provides a high gate voltage and a low gate voltage to the gate driver, wherein a voltage level of the high gate voltage in the low afterimage mode is lower than a voltage level of the high gate voltage in the normal mode.

8. The display device of claim 7, wherein a voltage level of the low gate voltage in the low afterimage mode is equal to a voltage level of the low gate voltage in the normal mode.

9. The display device of claim 1, wherein the standby mode further includes an illuminance sensing mode in which an ambient illuminance is detected.

10. The display device of claim 9, wherein a ratio of the non-emission period to the frame period in the illuminance sensing mode is greater than the ratio of the non-emission period to the frame period in the low afterimage mode.

11. The display device of claim 9, wherein the illuminance sensing mode is performed when a user views an image displayed by the display panel.

12. The display device of claim 1, wherein the standby mode further includes a low power mode, and wherein a number of the pulses of the gate signal within the non-emission period in the low power mode is less than the number of the pulses of the gate signal within the non-emission period in the low afterimage mode.

13. The display device of claim 12, wherein the low afterimage mode is performed after the low power mode is performed for a predetermined time.

14. The display device of claim 1, wherein the standby mode is a mode in which the display panel displays an AOD (Always On Display) image.

15. An electronic apparatus, comprising:

a display device operable in a normal mode or a standby mode including a low afterimage mode;

a gyro sensor which detects a rotation state of the display device; and an illuminance sensor which detects an ambient illuminance around the display device, wherein the display device includes:

a display panel which includes a pixel;

a gate driver which provides a gate signal to the pixel;

an emission driver which provides an emission signal defining a non-emission period and an emission period to the pixel;

a data driver which provides a data voltage to the pixel; and a controller which controls the gate driver, the emission driver, and the data driver, wherein a number of pulses of the gate signal within the non-emission period in the low afterimage mode is greater than a number of the pulses of the gate signal within the non-emission period in the normal mode, wherein a ratio of the non-emission period to a frame period in the low afterimage mode is less than a ratio of the non-emission period to the frame period in the normal mode, and wherein a voltage of an input white data input to the controller in the low afterimage mode is lower than a voltage of the input white data in the normal mode.

16. The electronic apparatus of claim 15, wherein a range of the data voltage in the low afterimage mode is less than a range of the data voltage in the normal mode.

17. The electronic apparatus of claim 15, wherein the display device further includes a power management circuit which provides a high gate voltage and a low gate voltage to the gate driver, and wherein a voltage level of the high gate voltage in the low afterimage mode is lower than a voltage level of the high gate voltage in the normal mode.

18. The electronic apparatus of claim 15, wherein the standby mode further includes an illuminance sensing mode in which the illuminance sensor detects the ambient illuminance.

19. The electronic apparatus of claim 18, wherein a ratio of the non-emission period to the frame period in the illuminance sensing mode is greater than the ratio of the non-emission period to the frame period in the low afterimage mode.

20. The electronic apparatus of claim 18, wherein whether a user views an image displayed by the display device is determined using the gyro sensor, and wherein the illuminance sensing mode is performed when the user views the image.

* * * * *